Figure 1:
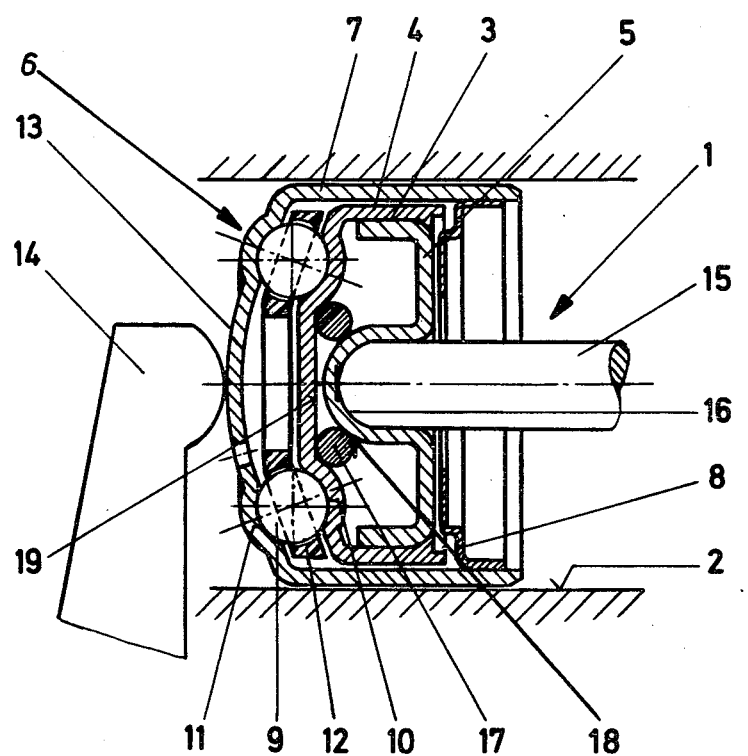

United States Patent [19]

Kunkel et al.

[11] 4,138,171
[45] Feb. 6, 1979

[54] AXIALLY SUPPORTED THRUST BEARING

[75] Inventors: Heinrich Kunkel, Schweinfurt; Rainer Schürger, Schwanfeld; Otto Matyschik, Nuedlingen, all of Fed. Rep. of Germany

[73] Assignee: SKF Kugellagerfabriken GmbH, Schweinfurt, Fed. Rep. of Germany

[21] Appl. No.: 764,976

[22] Filed: Feb. 2, 1977

[30] Foreign Application Priority Data

Feb. 4, 1976 [DE] Fed. Rep. of Germany ... 7603043[U]

[51] Int. Cl.² ............................................. F16D 23/14
[52] U.S. Cl. ................................. 308/233; 192/110 B
[58] Field of Search ................... 192/91 A, 98, 110 B; 308/219, 232, 233, 234; 403/132, 133, 225, 228

[56] References Cited

U.S. PATENT DOCUMENTS

| 1,857,168 | 5/1932 | Steiner et al. ..................... 403/228 X |
| 2,819,063 | 1/1958 | Neidhart .......................... 403/228 X |
| 2,999,707 | 9/1961 | Kniepkamp et al. ................ 403/225 |
| 3,842,954 | 10/1974 | Hönemann .................... 192/110 B X |

FOREIGN PATENT DOCUMENTS 2420255 11/1975 Fed. Rep. of Germany ............ 192/98

*Primary Examiner*—Stephen G. Kunin
*Attorney, Agent, or Firm*—Daniel M. Rosen

[57] ABSTRACT

A clutch thrust bearing has thin-walled bearing members formed to define a race therebetween for receiving rolling bearing elements. One of the bearing members has a generally radially extending central wall portion, and an axially extending annular wall portion, the center portion defining one wall of the race and the axially extending portion extending away from the other bearing member. The one bearing member further includes a second thin-walled portion on the side of the bearing away from the other member, and axially spaced from the center wall portion of the same member. This thin-walled portion has a central depression for receiving thrust loads on the bearing, and the outer walls of this portion extend axially and are telescoped with the first mentioned axially extending wall. An elastic member is provided between the two center portions of the one member, and may be in the form of a split ring or an elastic material.

16 Claims, 2 Drawing Figures

AXIALLY SUPPORTED THRUST BEARING

The present invention relates to a ball thrust bearing, and particularly a clutch disengagement bearing. In conventional bearings of this type, such as shown in German Offentlegungsschrift No. 2,420,225, laid open on Nov. 13, 1975, the thin-walled race members are preferably fabricated without the aid of cutting tools. One of the race members, termed the housing race, is cup-shaped and envelops the other race. The other race, termed the shaft race, is enveloped with radial clearance and consists of two parts, slipped one into the other telescope-fashion, and having side walls extending axially. One of the parts embodies the race for the rolling elements or balls arranged between the race members. The other part is provided with a central depression or socket to receive the shaft end or the end of a push rod actuating the clutch.

A bearing of this kind may be conventionally employed in the form of a clutch disengagement bearing. A lever exerts a force on the push rod by way of the bearing. This rod, by its axial displacement, effects the disengagement of the clutch. In this known type of bearing, the two telescoped parts of the shaft race are in snug contact with each other at the center. Therefore the force exerted on the push rod by way of the bearing to actuate the clutch acts directly on the center of the part of the shaft member embodying the race and, owing to the small areas of contact of the two parts, very high specific pressures may develop, which may lead to deformation of the part embodying the race. This is particularly so if the force is applied abruptly. In an extreme case, the limits of allowable load on the two parts may be reached. The two telescoping thin-walled parts moreover act as a resonator, so that any vibration may cause undue noise.

It is therefore the object of the present invention to provide a novel and unique construction in a bearing of the type described above, a bearing that will reduce specific pressures between its several parts and thus reduce the risk of deformation, elastically absorb concussions occurring in operation, and serve to reduce noise as well.

To accomplish the foregoing object, elastic means are arranged between the two parts of the shaft race for their axial support.

The elastic means may consist of a ring or disc of elastically yielding material, for example, a synthetic material. In a preferred embodiment, by way of example, a slit ring of spring wire or the like may alternatively be used. As a further alternative, the cavity between the two parts of the shaft race may be filled with an elastic material, for example, synthetic material, as by injection. In this embodiment, it is further expedient to locate the opening for introducing the elastic material in the center of the part of the shaft member incorporating the race and to have the elastic material protruding from the opening to form a head.

Figure 2:
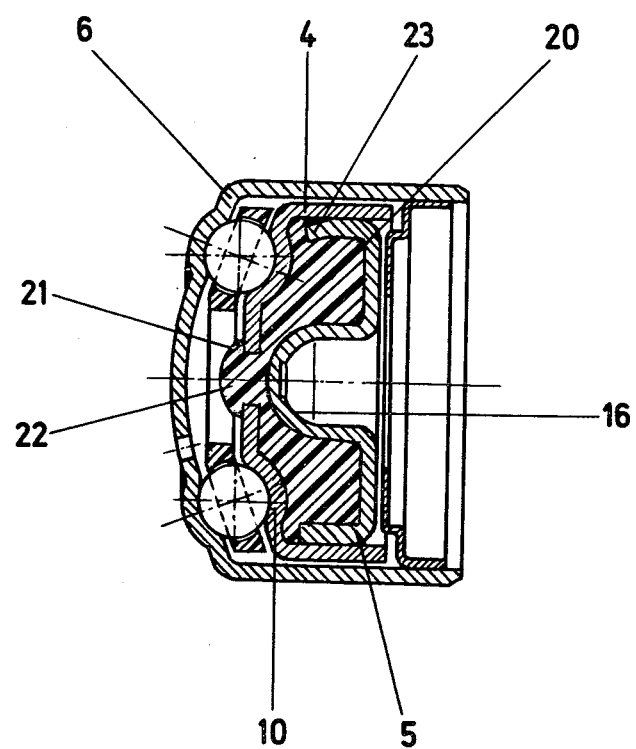

Other features of the present invention will be described below with reference to the embodiments represented by way of example in the drawings, wherein:

FIG. 1 shows an embodiment of the present invention wherein a ring of elastically yielding material is arranged between the parts of the shaft race; and FIG. 2 shows a further embodiment of the present invention wherein the cavity between the two parts of the shaft race is filled with an elastic material.

The disengagement bearing 1, arranged axially displaceable in a housing bore 2, consists of a two-part shaft race 3 whose parts 4 and 5 are provided with side walls extending axially. The parts 4 and 5 are slipped one into the other telescope-fashion. A cup-shaped housing race 6 is provided, with a ring angle 8 in the barrel of its annular axial extension 7 to hold the bearing together. Both part 4 of shaft race 3 and the housing race 6 embody race surfaces 10 and 11 matching the balls 9 in cross-section. The balls 9 are held spaced apart in a cage 12. The housing race 6, as aforementioned, is cup-shaped, that is, it has a head 13 which, as shown in the example, is dish-shaped. This head 13 provides a contact surface for the disengagement lever 14 to displace the bearing 1 axially and thereby actuate the clutch. This actuation takes place by way of a push rod 15 entering a socket 16 of part 5 of the shaft race 3. The push rod is connected to the diaphragm or disc spring (not shown) of the clutch, which effects the disengagement and engagement of the clutch plate.

According to the present invention, a spring wire ring 17, which may, for example, be slitted, is arranged between parts 4 and 5 of the shaft race 3. It is alternatively possible to employ a ring of elastically yielding material, for example, synthetic material. The ring 17 rests on one side against the convex outer surface 18 of socket 16 and on the other side against the plane inner surface 19 of the part 4 incorporating the race 10. The ring 17, able to abut in radial direction against the bulge formed by the race 10, is thick enough so that between the extreme elevation of the socket 16 and opposed surface 19 of part 4 at the utmost possible elastic deformation of the ring 17, some clearance always remains.

The arrangement of this elastic ring between the two parts 4 and 5 of shaft race 3 transmits forces between these two parts on a larger, annular area, that is, the specific pressure is less. Therefore, and because of the distance of the points of application of the forces transmitted from the center, the bending moments in the head of part 4 are less, so that the danger of deformation or indeed failure is practically eliminated. In addition, the elastic ring 17 elastically absorbs concussions occurring in operation, and serves as a noise damper.

The bearing of FIG. 2 consists essentially of the same components as the bearing of FIG. 1. The only difference is that the cavity between parts 4 and 5 of the shaft race 3 is filled with an elastic material 20, for example synthetic material. The filling may, for example, be accomplished by casting or injection. For this purpose, part 4 has an opening 21 in the center. The diameter of this opening 21 is smaller than the diameter of the projection of socket 16 in part 5. This insures that no direct contact of parts 4 and 5 will occur in this region. The injected material 20 may advantageously protrude beyond the part 4 of the shaft member 3 embodying the race, thus forming a knob 22 and improving the interconnection of the parts. To improve the interconnection of parts 4 and 5, the free end of the axial side wall of part 5 may be bent in as shown at 23, either all around the circumference or at certain points only. The material 20 embracing these tabs 23 together with the knob 22 holds parts 4 and 5 together. Thus in this example part 5 is supported by way of the injected material 20 on a large area of part 4. This means that the force exerted by the disengagement lever on the push rod by way of the bearing is transmitted with elastic yielding over a large area. The filler material 20 at the same time serves to damp the noise of the bearing.

As above discussed, in FIG. 2 the opening 21 has a diameter smaller than the diameter of the projection of the socket 16 in part 5. It is apparent that the diameter of the opening may alternatively be larger than the diameter of the projection of the socket 16 in part 5, in order, for example, to facilitate filling of the space between the bearing parts. In this case, of course, the gap between the parts must be adequately large to inhibit contacting of the parts.

These embodiments as above described are merely examples of the present invention. Obviously, other possible modifications of design will be apparent within the spirit and scope of the invention.

What is claimed is:

1. In a rolling element thrust bearing, formed with thin-walled housing race and shaft race members, said housing race being cup-shaped and enveloping said shaft race with radial clearance, said shaft race including two parts, slipped one into the other telescope-fashion, and having axially extending side walls joined to radially extending center walls, one of said parts incorporating the race for said rolling elements, said rolling elements being arranged between the race members, the other of said parts having a central depression in its center wall for accommodating means adapted to apply pressure thereon, the improvement wherein said center walls of said shaft race member are axially spaced apart and further comprising elastic means arranged between said two center walls of said shaft member for axially supporting said parts relative to each other and holding said center walls fully spaced apart at least in the absence of axial forces on said bearing.

2. The bearing of claim 1, wherein said elastic means is a circularly shaped elastically yielding synthetic material arranged between said parts of said shaft race.

3. The bearing of claim 2, wherein said elastic material is a ring resting against the outer surface of said depression.

4. The bearing of claim 1, wherein a cavity formed between said two parts of said shaft race is filled with said elastic means.

5. The bearing of claim 4, wherein said elastic means is a synthetic material inserted by casting or injection.

6. In a rolling element thrust bearing, formed with thin-walled housing race and shaft race members, said housing race being cup-shaped and enveloping said shaft race with radial clearance, said shaft race including two parts, slipped one into the other telescope-fashion, and having axially extending side walls joined to radially extending center walls, one of said parts incorporating the race for said rolling elements, said rolling elements being arranged between the race members, the other of said parts having a central depression in its center wall for accommodating means adapted to apply pressure thereon, the improvement wherein said center walls of said shaft race member are axially spaced apart and further comprising elastic means arranged between said two center walls of said shaft member for axially supporting said parts relative to each other, said elastic means comprising a circularly shaped elastically yielding synthetic material arranged between said parts of said shaft race, said elastic means comprising a slit ring arranged between said parts of said shaft race.

7. The bearing of claim 6, wherein said ring is of a height such that between the extreme elevation of the depression and a surface of said other part, at the utmost possible elastic deformation of said ring, some clearance remains.

8. In a rolling element thrust bearing, formed with thin-walled housing race and shaft race members, said housing race being cup-shaped and enveloping said shaft race with radial clearance, said shaft race including two parts, slipped one into the other telescope-fashion, and having axially extending side walls joined to radially extending center walls, one of said parts incorporating the race for said rolling elements, said rolling elements being arranged between the race members, the other of said parts having a central depression in its center wall for accommodating means adapted to apply pressure thereon, the improvement wherein said center walls of said shaft race member are axially spaced apart and further comprising elastic means arranged between said two center walls of said shaft member for axially supporting said parts relative to each other, a cavity being formed between said two parts of said shaft race and filled with said elastic means, said elastic means comprising a synthetic material inserted by casting or injection, and wherein an opening is provided for introducing said elastic material in the center of that part of said shaft race member which incorporates said race.

9. The bearing of claim 8, wherein the diameter of said opening is greater than the diameter of the projection of said depression.

10. In a rolling element thrust bearing, formed with thin-walled housing race and shaft race members, said housing race being cup-shaped and enveloping said shaft race with radial clearance, said shaft race including two parts, slipped one into the other telescope-fashion, and having axially extending side walls joined to radially extending center walls, one of said parts incorporating the race for said rolling elements, said rolling elements being arranged between the race members, the other of said parts having a central depression in its center wall for accommodating means adapted to apply pressure thereon, the improvement wherein said center walls of said shaft race member are axially spaced apart and further comprising elastic means arranged between said two center walls of said shaft member for axially supporting said parts relative to each other, a cavity being formed between said two parts of said shaft race and filled with said elastic means, said elastic means comprising a synthetic material inserted by casting or injection, said elastic material protruding beyond said part of said shaft race member incorporating said race, thus forming a knob overlapping said opening.

11. A thrust bearing comprising first and second relatively rotatable members having portions that are axially spaced apart and define a race therebetween, rolling bearing elements positioned in said race, said first member comprising a first thin-walled part having a first center wall and a first axially extending annular wall joined to said first center wall, whereby said race is formed in said first center wall and said first axially extending wall extends in a direction away from said second member, said first member further comprising a second thin-walled part having a second center wall axially spaced from said first center wall and a second axially extending annular wall joined to said second center wall and telescoped with said first axially extending wall, said second center wall having a central load receiving depression extended toward said first center wall, and further comprising elastic means positioned between and axially engaging said first and second center walls, said elastic means fully axially spacing said center walls at least in the absence of axial forces on said thrust bearing.

12. The thrust bearing of claim 11 wherein said elastic means comprises an elastic material filling the space between said first and second parts.

13. The thrust bearing of claim 11 wherein said elastic material comprises an elastic ring positioned in the space between said center walls, said race and depression comprising deformed parts of said first and second center walls respectively, said ring contacting said race and depression between said first and second center walls.

14. The thrust bearing of claim 13 wherein said ring comprises a split ring.

15. The thrust bearing of claim 11 wherein said first and second parts of said first member are of a sheet metal.

16. A thrust bearing comprising first and second relatively rotatable members having portions that are axially spaced apart and define a race therebetween, rolling bearing elements positioned in said race, said first member comprising a first thin-walled part having a first center wall and a first axially extending annular wall joined to said first center wall, whereby said race is formed in said first center wall and said first axially extending wall extends in a direction away from said second member, said first member further comprising a second thin-walled part having a second center wall axially spaced from said first center wall and a second axially extending annular wall joined to said second center wall and telescoped with said first axially extending wall, said second center wall having a central load receiving depression extended toward said first center wall, and further comprising elastic means positioned between and axially engaging said first and second center walls, said elastic means comprising an elastic material filling the space between said first and second parts, said first center wall having a central aperture, said elastic material extending through said aperture and engaging said first center wall on the side thereof toward said second member.

* * * * *